(12) United States Patent
Roditi et al.

(10) Patent No.: US 9,395,638 B2
(45) Date of Patent: Jul. 19, 2016

(54) LIQUID ELECTROPHOTOGRAPHIC INKS

(75) Inventors: Stella Stolin Roditi, Nes Ziona (IL); Haim Cohen, Nes Ziona (IL); Getahun Biadglin, Nes Ziona (IL); Fernanda Orlik, Nes Ziona (IL); Nava Klein, Nes Ziona (IL); Albert Teishev, Nes Ziona (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 40 days.

(21) Appl. No.: 14/365,923

(22) PCT Filed: Dec. 19, 2011

(86) PCT No.: PCT/EP2011/006454
§ 371 (c)(1),
(2), (4) Date: Jun. 16, 2014

(87) PCT Pub. No.: WO2013/091667
PCT Pub. Date: Jun. 27, 2013

(65) Prior Publication Data
US 2014/0363208 A1 Dec. 11, 2014

(51) Int. Cl.
*G03G 9/00* (2006.01)
*G03G 9/12* (2006.01)
*G03G 9/135* (2006.01)
*G03G 9/08* (2006.01)
*C09D 11/02* (2014.01)
*C09D 11/12* (2006.01)

(52) U.S. Cl.
CPC *G03G 9/12* (2013.01); *C09D 11/02* (2013.01); *C09D 11/12* (2013.01); *G03G 9/0804* (2013.01); *G03G 9/135* (2013.01); *G03G 9/1355* (2013.01); *G03G 2215/0658* (2013.01)

(58) Field of Classification Search
CPC ............................. G03G 9/135; G03G 9/1355
USPC .................................................. 430/114, 115
See application file for complete search history.

(56) References Cited

U.S. PATENT DOCUMENTS

| 4,526,852 | A * | 7/1985 | Herrmann ............... G03G 9/135 |
| | | | 430/115 |
| 6,776,829 | B2 | 8/2004 | Miyamoto et al. |
| 7,029,818 | B2 | 4/2006 | Rohr et al. |
| 7,492,504 | B2 | 2/2009 | Chopra et al. |
| 2010/0055602 | A1 * | 3/2010 | Teshima ...................... 430/114 |

(Continued)

FOREIGN PATENT DOCUMENTS

| GB | 2194069 | 2/1988 |
| JP | 2000181126 | 6/2000 |
| JP | 2000310878 | 11/2000 |
| JP | 2003195555 | 7/2003 |

(Continued)

OTHER PUBLICATIONS

International Search Report dated Sep. 6, 2012 for International application No. PCT/EP2011/006454 filed Dec. 19, 2011, Applicant Hewlett-Packard Indigo B.V.

*Primary Examiner* — Mark A Chapman
(74) *Attorney, Agent, or Firm* — Thorpe, North & Western L.L.P.

(57) ABSTRACT

The present invention relates to a liquid electrophotographic ink comprising a carrier liquid, a pigmented resin composite dispersed in the carrier liquid, and about 0.15 to about 10% (w/w) of an organic wax. The liquid electrophotographic ink is typically formulated for printing in a liquid electrophotographic printer.

20 Claims, 3 Drawing Sheets

(56) References Cited

U.S. PATENT DOCUMENTS

| | | | |
|---|---|---|---|
| 2010/0062361 A1* | 3/2010 | Iwase | 430/114 |
| 2010/0222498 A1 | 9/2010 | Yatake et al. | |
| 2011/0008725 A9 | 1/2011 | Marko | |
| 2011/0123228 A1 | 5/2011 | Roditi et al. | |

FOREIGN PATENT DOCUMENTS

| | | |
|---|---|---|
| JP | 2010060849 | 3/2010 |
| WO | 2009151446 | 12/2009 |
| WO | 2011110221 | 9/2011 |

\* cited by examiner

LIQUID ELECTROPHOTOGRAPHIC INKS

BACKGROUND OF THE INVENTION

Electrophotographic printing techniques involve the formation of a latent image on a photoconductor surface mounted on an imaging plate or other surface. In one instance, the photoconductor is first sensitized, usually by charging, and then exposed to light projected through a positive film of the document to be reproduced, resulting in dissipation of the charge in the areas exposed to light. The latent image is subsequently developed into a full image by the attraction of oppositely charged toner particles to the charge remaining on the unexposed areas. For liquid electrophotographic inks, the developed image is transferred from the photoconductor to a hot elastomeric blanket, from which it is transferred to a substrate, such as paper, plastic or other suitable material, by heat or pressure or a combination of both to produce the printed final image.

The latent image can be developed using, either a dry toner (a colorant mixed with a powder carrier) or a liquid ink (a suspension of a pigmented resin in a liquid carrier). The toner or ink generally adheres to the substrate surface with little penetration into the substrate. Liquid inks used in liquid electrophotography are generally composed of pigmented thermoplastic resin particles suspended in a non-conducting liquid carrier, generally a saturated hydrocarbon. Offset-preventing and release-facilitating oil, such as silicone oil, is often used to increase the efficiency of ink transfer from the imaging surface. The liquid ink is electrostatically charged and brought into contact with the photoconductor surface to develop the latent image. When transferred to a hot elastomeric blanket and heated, the particles melt and fuse to form a tacky polymer film. When the tacky polymer film comes in contact with a cooler surface, such as a paper substrate, the film hardens and adheres to the substrate and peels away from the blanket, laminating the paper. The ink is deposited onto the substrate essentially dry, and desired print finishing can be performed immediately. Since the ink is transferred completely from the blanket to the substrate, a new layer in a different color can be created for every rotation of the press.

The small particle size used in liquid inks allows the printing of high resolution, high gloss images with sharp edges and very thin image layers. However, due to the fact that the print produced by liquid ink is not absorbed into the paper but is attached to the paper surface by adhesive attraction, the print may be prone to damage by scratching, peeling, or flaking. As such, improved electrophotographic inks continue to be sought through ongoing developmental and research efforts.

DETAILED DESCRIPTION

Before the present invention is disclosed and described, it is to be understood that this invention is not limited to the particular methodology, protocols and materials described herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof. For the purpose of the present invention, all references cited herein are incorporated by reference in their entireties.

As used herein, "electrophotographic printing" generally refers to the process that provides an image that is transferred from a photo imaging substrate either directly or indirectly via an intermediate transfer member. As such, the image is not substantially absorbed into the substrate on which it is applied. Additionally, "electrophotographic printers" generally refer to those printers capable of performing electrophotographic printing. "Liquid electrophotographic printing" is a specific type of electrophotographic printing where a liquid ink is employed in the electrophotographic process rather than a powder toner.

As used herein, "peel test" refers to evaluating the adherence property and includes applying adhesive tape on a printed ink layer and measuring the amount of area from which ink was removed from the substrate or the amount of area on which ink remained on the substrate after removing the tape.

As used herein, "melting point" or "melting range" refers to the temperature or temperature range of the phase transition from the solid to the liquid state of a substance, as determined by differential scanning calorimetry (DSC), usually with a DSC 30.

As used herein, "hydroxyl number" refers to the concentration of hydroxyl groups in a substance; "saponification number" is a measure of the average molecular weight (or chain length) of all the fatty acids present in a substance.

As used herein, "swelling" refers to the increase of volume of material due to absorption of a solvent. As used herein, "solubility" refers to the amount of non-volatile material (% w/w) dissolved in the swelling extraction liquid after swelling to saturation.

As used herein, "tacticity" refers to the relative stereochemistry of adjacent chiral centers within a macromolecule, wherein a "tactic" macromolecule refers to a macromolecule in which essentially all the configurational (repeating) units are identical. As used herein, "mixed tacticity polypropylene" refers to a polypropylene comprising a variety of relative stereo-chemical structures within the materials described, namely possessing e.g. both isotactic and a-tactic areas within the material simultaneously, which might result in a lower melting range molecular fraction and a higher melting range molecular fraction.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 0.15 to about 10% (w/w)" should be interpreted to include not only the explicitly recited values of about 0.15% to about 10% (w/w), but also include individual values and sub-ranges within the indicated range. Thus, included in this numerical range are individual values such as 0.2, 0.25, 1, 2, 3.5, and 4 and sub-ranges such as from 0.15 to 10, from 0.2 to 2, from 0.25 to 1, from 0.5 to 10, from 0.5 to 5, and from 1 to 4, etc. This same principle applies to ranges reciting only one numerical value. Furthermore, such an interpretation should apply regardless of the breadth of the range or the characteristics being described.

The present invention provides a liquid electrophotographic ink, comprising (a) a carrier liquid, (b) a pigmented resin composite dispersed in the carrier liquid, and (c) about 0.15 to about 10% (w/w) of an organic wax.

The liquid electrophotographic ink according to the invention is formulated for printing in a liquid electrophotographic printer.

The present invention furthermore provides methods for producing a liquid electrophotographic ink with reduced peeling damage, comprising forming a pigmented resin composite to be dispersed in a carrier liquid and adding about 0.15 to about 10% (w/w) of an organic wax during grinding of the pigmented resin composite.

The present invention furthermore provides methods for producing a liquid electrophotographic ink with reduced peeling damage, comprising adding about 0.15 to about 10% (w/w) of an organic wax to the ready-made ink.

The present invention furthermore provides a printing method comprising the steps of (1) providing the liquid electrophotographic ink according to the invention or the liquid electrophotographic ink obtained in the method according to the invention, (2) heating the ink of (1) and applying it to a substrate, (3) obtaining a printed image on the substrate.

The present invention furthermore provides the use of the liquid electrophotographic ink according to the invention or the liquid electrophotographic ink obtained in the method according to the invention for printing in a liquid electrophotographic printer.

The present invention furthermore provides a kit comprising (1) a ready-made liquid electrophotographic ink comprising a carrier liquid and a pigmented resin composite dispersed in the carrier liquid, and (2) an organic wax, suitable to be added to the ready-made ink of (1) with a content of about 0.15 to about 10% (w/w), wherein the organic wax has a melting range starting at about 50° C.

The present inks, methods, uses and kits unexpectedly provide liquid electrophotographic inks with reduced peeling damage. Without intending to be bound by any particular theory, the present liquid electrophotographic inks provide reduced peeling damage by comprising or adding an organic wax. Specifically, the LEP inks methods, uses and kits described herein comprise or add an organic wax with specific properties.

In one embodiment, the organic wax has a melting range starting at about 50° C., specifically at about 60° C. In one embodiment, the melting range of the organic wax is about 50 to 110° C., more specifically about 60 to 95° C. Specifically, the melting range of the organic wax starts at a temperature below about 80° C.

In an embodiment the organic wax is of natural origin, specifically a vegetable wax.

A specific vegetable wax is a castor wax or hydrogenated castor oil derivative, such as hydrogenated castor oil triglyceride.

Exemplary, the vegetable waxes, such as castor oil derivatives, can have the following chemical characteristics: triglyceride type, bulky molecular structure wax with larger intermolecular spacing as compared to PE-based waxes, melting range of about 50 to 80° C. For example, see Table 1 of the Examples.

A specific castor oil derivative comprises the compound of Formula 1

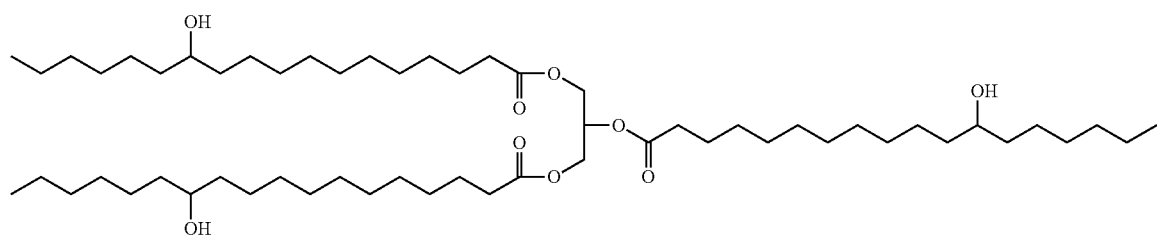

(1)

For example, castor oil derivates have a molecular weight in the range of about 900 to 960, such as about 920 to 940, such as about 940.

For example, castor oil derivates have a hydroxyl number in the range of about 140 to 170, such as 145-165 or about 160 or about 158.

For example, castor oil derivates have a saponification number in the range of about 170 to 190, such as 175-185 or about 180.

For example, castor oil derivates have a melting point in the range of about 80 to 95° C., such as 83-90° C. or about 85 or about 86° C.

For example, castor oil derivates have a swelling in the range of about 5 to 15% Sol-L, such as of about 10% Sol-L.

For example, castor oil derivates have a solubility in the range of about 1 to 5 Sol-L, such as of about 2 Sol-L.

An example is the commercially available SiberFlowC85 from DKSH.

In an embodiment the organic wax is of synthetic origin, specifically a polypropylene (PP) wax. For example, organic waxes suitable for the LEP inks of the present invention are not polyethylene (PE)-based waxes.

Exemplary, the polypropylene (PP) waxes can have the following chemical characteristics: mixed tacticity, larger intermolecular spacing as compared to PE-based waxes, comprising a lower melting range molecular fraction, with a melting range starting at about 60° C., such as a melting range of about 60 to 110° C. They can further comprise a higher melting range molecular fraction with a melting range starting at about 125° C. For example, see Table 1 of the Examples.

For example, a polypropylene wax has a swelling in the range of about 5 to 15% Sol-L, such as about 12% Sol-L.

For example, a polypropylene wax has a solubility in the range of about 1 to 5 Sol-L, such as of about 4 Sol-L.

An example is the commercially available micronized modified PP wax PINNACLE® 1995 (PP195) from Lubrizol Advances Materials, Inc.

The liquid electrophotographic inks and kits comprise about 0.15 to about 10% (w/w) of the organic wax. In the methods about 0.15 to about 10% (w/w) of the organic wax are added to the inks.

In an embodiment, the liquid electrophotographic inks and kits comprise about 0.15 to about 5% (w/w), specifically about 0.2 to about 2% (w/w), more specifically about 0.25 to about 1% (w/w) of the vegetable wax, such as the hydrogenated castor oil derivative wax.

In an embodiment, the liquid electrophotographic inks and kits comprise about 0.5 to about 10% (w/w), specifically about 0.5 to about 5% (w/w), more specifically about 1 to about 4% (w/w) of the polypropylene wax.

The liquid electrophotographic inks and kits can also comprise more than one of the organic waxes, such as mixtures of a vegetable wax (such as castor oil derivative) and a polypropylene wax.

The organic wax materials of the inks, methods and kits of the invention are sufficiently compatible, and thus readily plasticized by, the carrier liquid. Without intending to be bound by any particular theory, they melt more rapidly than the surrounding resin matrix, and, thus, easily migrate to the surface of the printed image. Thus a "skin" layer with low adhesion to pressure sensitive adhesive tape is generated. This results in lower damage caused to the printed image during the peel test. Thus, peeling damage caused to the printed image is markedly reduced. The organic wax material does not effect other durability attributes of the ink, such as scratch resistance. Furthermore and without intending to be bound by any particular theory, the organic wax materials have a mobility during the printing process enabling them to migrate to the surface of the printed image which is due to their melting range that starts at a lower temperature than closely packed, narrow molecular weight distribution waxes, such as polyethylene-based waxes. The organic wax materials of the LEP inks of the invention can advantageously be added to the production sequence of the ink, or added externally, stirred in on demand into the ready-made ink.

The LEP inks methods and kits of the invention have the following advantageous characteristics:

1. Decrease of peeling damage on printed images as, for example, evaluated by a customer.
2. Improvement of high coverage print readiness and robustness towards finishing processes.
3. Increase of prints durability short time after printing.
4. Decrease of the level of damage generated on fresh prints.

Carrier liquids for LEP inks are known in the art. Generally, the carrier liquid acts as a dispersing medium for the other components in the LEP ink. For example, the carrier liquid comprises at least one aliphatic hydrocarbon, such as paraffins and isoparaffins. As such, carrier liquids can comprise, or substantially comprise, or even essentially consist of isoparaffins, such as or equivalent to the ISOPAR® high-purity isoparaffinic solvents with narrow boiling ranges marketed by Exxon Mobil Corporation (Fairfax, Va., USA). Also suitable as carrier liquids or components of carrier liquids for implementing embodiments of the present disclosure are alkanes having from about 6 to about 14 carbon atoms such as solvents sold under the NORPAR® (NORPAR® 12, 13 and 15) tradename available from Exxon Mobil Corporation (Fairfax, Va., USA). Other hydrocarbons for use as carrier liquids or vehicle components are sold under the AMSCO® (AMSCO® 460 and OMS) tradename available from American Mineral Spirits Company (New York, N.Y., USA), under the SOLTROL® tradename available from Chevron Phillips Chemical Company LLC (The Woodlands, Tex., USA) and under the SHELLSOL® tradename available from Shell Chemicals Limited (London, UK). Such carrier liquids and vehicle components have desirable properties such as low odor, lack of color, selective solvency, good oxidation stability, low electrical conductivity, low skin irritation, low surface tension, superior spreadability, narrow boiling point range, non-corrosive to metals, low freeze point, high electrical resistivity, high interfacial tension, low latent heat of vaporization and low photochemical reactivity.

The LEP inks comprise a pigmented resin composite comprising pigment(s) and resin(s) or polymer(s).

As used herein, "pigment" generally includes pigment colorants, magnetic particles, aluminas, silicas, and/or other ceramics or organo-metallics, whether or not such particulates impart color. Thus, though the present description primarily exemplifies the use of pigment colorants, the term "pigment" can be used more generally to describe not only pigment colorants, but other pigments such as organometallics, ferrites, ceramics, etc.

The pigment(s) of the pigmented resin composite, which are dispersed in the carrier liquid, can be any pigment compatible with the carrier liquid and useful for electrophotographic printing. For example, the pigment may be present as pigment particles. The pigments can be any of those commonly used as known in the art. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3G, CROMOPHTHAL® YELLOW GR, CROMOPHTHAL® YELLOW 8G, IRGAZINE® YELLOW SGT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 6901F, HELIOGEN® BLUE TBD 7010, HELIOGEN® BLUE K 7090, HELIOGEN® BLUE L 7101F, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; pigments by Paul Uhlich including UHLICH® BK 8200; and Carbon Black.

The resin(s) or polymer(s) of the pigmented resin composite, which are dispersed in the carrier liquid, can be any resin/polymer compatible with the carrier liquid and useful for electrophotographic printing.

The resin(s) or polymer(s) can be resin matrices or resin particles, such as the resin polymers described in WO 2011/003442 A1.

Resin polymers can include, but are not limited to, thermoplastic resins. In particular, the resin polymers can include, but are not limited to, ethylene acid copolymers, ethylene acrylic acid copolymers, methacrylic acid copolymers, ethylene vinyl acetate copolymers, copolymers of ethylene, acrylic, or methacrylic acid and combinations thereof. In another embodiment, the resin polymers can include, but are not limited to, alkyl (C1 to C20) ester of methacrylic or acrylic acid; polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g., copolymer of acrylic or methacrylic acid and at least one alkyl ester of acrylic or methacrylic acid wherein alkyl is from 1 to about 20 carbon atoms); ethylene-acrylate terpolymers: ethylene-acrylic esters-maleic anhydride (MAH) or glycidyl methacrylate (GMA) terpolymers; low molecular weight ethylene-acrylic acid ionomers and any combinations thereof.

In an embodiment, the resin polymers can include, but are not limited to, the Nucrel family of resins (e.g., Nucrel 403®, Nucrel 407®, Nucrel 609HS®, Nucrel 908HS®, Nucrel 1202HC®, Nucrel 30707®, Nucrel 1214®, Nucrel 903®, Nucrel 3990®, Nucrel 910®, Nucrel 925®, Nucrel 699®, Nucrel 599®, Nucrel 960®, Nucrel RX 76®, Nucrel 2806®), Bynel® 2002, Bynel® 2014, Bynel 2020®, and Bynel® 2022 (sold by E. I. du PONT), the Aclyn family of resins (e.g. Aclyn 201, Aclyn 246, Aclyn 285, and Aclyn 295), the Lotader family of resins (e.g. Lotader 2210, Lotader, 3430, and Lotader 8200) sold by Arkema.

The resin(s) or polymer(s) can be polymer blends, such as the polymer blend of three polymers as described in US 2011/0123228 A1.

For example, the polymer(s) can be selected from resin(s) such as ethylene-vinyl acetate (EVA) copolymers; copolymers of ethylene and an ethylenically unsaturated acid of either acrylic acid and methacrylic acid; copolymers of ethylene, acrylic or methacrylic acid/alkyl ester of methacrylic or acrylic acid; polyethylene; polystyrene; crystalline polypropylene; ethylene ethyl acrylate; ethylene methacrylic acid copolymers which are partially neutralized with metal ions (e.g. Zn, Na, Li) such as SURLYN® ionomers; acid modified ethylene vinyl acetate terpolymer or blends thereof; polyesters; polyvinyl toluene; polyamides; styrene/butadiene copolymers; combinations thereof; and blends thereof. Furthermore, the polymers can be copolymers of ethylene and an ethylenically unsaturated acid of either acrylic or methacrylic acid; an ionomer of ethylene methacrylic acid copolymer; an ester of ethylene methacrylic acid copolymer and an acid modified ethylene vinyl acetate terpolymer; combinations thereof; and/or blends thereof. Furthermore, the polymers can be a copolymer of ethylene and an ethylenically unsaturated acid of either acrylic or methacrylic acid. Furthermore, one or the first polymer can be a NUCREL® polymer, such as NUCREL® 925, NUCREL® 2906, NUCREL® 2806, or NUCREL® 960. Furthermore, one or the second polymer can be a NUCREL® polymer, such as NUCREL® 699 or NUCREL® 599. Furthermore, one or the third polymer can be copolymers of ethylene acrylic acid; acid modified polyethylene low molecular weight polymers; maleic anhydride modified polyethylene; and/or mixtures thereof. In one embodiment, the third polymer can be a copolymer of ethylene acrylic acid. In another embodiment, the third polymer can be a Honeywell polymer such as A-C® 5180 (ethylene acrylic acid copolymer), A-C 430® (ethylene vinyl acetate copolymer), or A-C 6702® (oxidized polyethylene).

In an embodiment, various types of additives may be employed in the LEP ink composition to optimize the properties of the ink. For example, the ink composition may also include any number of surface modifiers and any additional additives.

As described above, the present invention provides methods for producing a liquid electrophotographic ink with reduced peeling damage.

The methods for producing a LEP ink with reduced peeling damage, comprise the step of adding about 0.15 to about 10% (w/w) of an organic wax to the production sequence of the ink or to the ready-made ink.

Such production sequence or method can comprise the steps of, firstly, mixing a carrier liquid and a polymer/resin/resin polymer to form a slurry or a paste and, secondly, milling the slurry/paste with a pigment. In an embodiment, other components such as surface modifiers, dispersing agents and additives may be added to the slurry/paste. The mixture is then grinded in a, so-called, grinding step.

For example, the mixing is carried out in a mixer (e.g., double planetary mixer and the like). For example, the grinding step is made with a grinder e.g., an attritor, a disk mill, a sand mill, a ball mill, an impeller attrition mill, a vibro-energy mill, or the like; and ground for a period of time to form the ink composition. In another embodiment, the grinding step is made with a ball mill.

In one embodiment, the method for producing a liquid electrophotographic ink comprises forming a pigmented resin composite to be dispersed in a carrier liquid; and adding about 0.15 to about 10% (w/w) of an organic wax during grinding of the pigmented resin composite.

Here, the organic wax is specifically added to the slurry or paste of the carrier liquid and the polymer/resin/resin polymer which is milled with the pigment(s).

In another embodiment, the method for producing a liquid electrophotographic ink comprises adding about 0.15 to about 10% (w/w) of an organic wax to the ready-made ink, specifically by stirring. Here, the organic wax can be added on demand into a ready-made ink.

Here, the organic wax is specifically preliminary ground in the carrier liquid to generate a slurry. Said slurry is then added to the ready-made ink. For example, carrier liquids comprise isoparaffins, such the ISOPAR® high-purity isoparaffinic solvents (Exxon Mobil Corporation).

As described above, the present invention furthermore provides a printing method. The printing method of the invention is suitable for digital printing, including inkjet printing, electrophotographic printing, laser photo printing and thermal transfer printing, in particular printing in a liquid electrophotographic printer.

The printing method comprises (1) providing the liquid electrophotographic ink according to the invention or the liquid electrophotographic ink obtained in the method according to the invention, (2) heating or fusing the ink of (1) and applying it to a substrate, (3) obtaining a printed image on the substrate.

The substrate or receiver media can be of any size. The substrate (or media substrate) include any substrate that can be use in the inkjet printing arts, including, but in no way limiting to, resin coated papers (so-called photo-based papers), papers, overhead projector plastics, coated papers, fabrics, art papers (e.g. water color paper) and the like.

During heating of the ink and applying it to the substrate, the organic wax migrates to the image surface upon melting. In particular, the organic wax melts and migrates to the surface of the (printed) image and thereby generates a top or skin layer on the surface of the (printed) image, as described above.

As described above, the present invention provides the use of the liquid electrophotographic ink according to the invention or the liquid electrophotographic ink obtained in the method according to the invention for printing in a liquid electrophotographic printer.

In an embodiment, during printing, the organic wax migrates to the image surface upon melting. In particular and as described above, the organic wax melts and migrates to the surface of the image and thereby generates a top or skin layer on the surface of the printed image.

As described above, the present invention provides a kit comprising (1) a ready-made liquid electrophotographic ink comprising a carrier liquid and a pigmented resin composite dispersed in the carrier liquid, and (2) an organic wax, suitable to be added to the ready-made ink of (1) with a content of about 0.15 to about 10% (w/w), wherein the organic wax has a melting range starting at about 50° C., specifically at about 60° C.

The organic wax is specifically added by stirring. For example, the organic wax is preliminary ground in the carrier liquid to generate a slurry. Said slurry is then added to the ready-made ink.

For example, carrier liquids comprise isoparaffins, such the ISOPAR® high-purity isoparaffinic solvents (Exxon Mobil Corporation).

The kit according to the invention can contain more than one organic wax, such as mixtures of a vegetable wax (such as castor oil derivative) and a polypropylene wax.

The following examples and drawings describe exemplary embodiments of the present invention without, however, limiting the same thereto.

Figure 1:
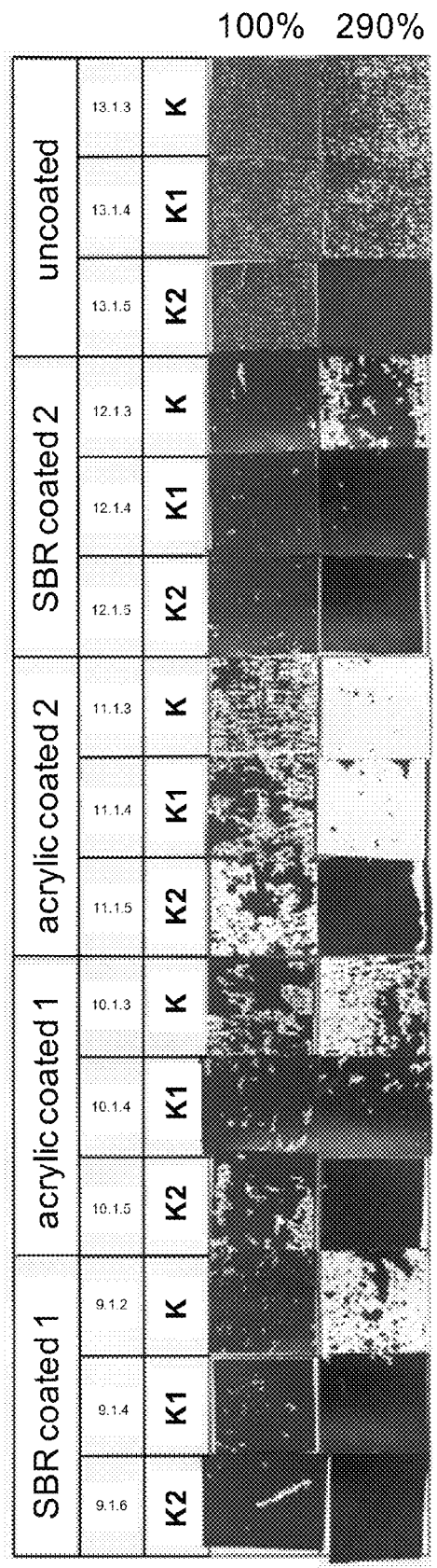
FIG. 1 shows photographs of printed images that were made with two exemplary ink formulations (K1 and K2) and a reference ink formulation (K) on various substrates after a peeling test.

Various exemplary embodiments will be described below by referring to several examples.

EXAMPLES

Ink Formulations
K ink (reference ink)

| Resin composition (out of paste solids, ~80% of total formulation solids) | | |
| --- | --- | --- |
| Carrier liquid | Isopar ® L | |
| Resin | Nucrel ® 925 (DuPont) | 72% |
| Resin | Nucrel ® 2806 (DuPont) | 18% |
| Resin | Bynel ® 2022 (DuPont) | 10% |
| Pigments/Additives (added to the resin composition) | | |
| Pigment | Carbon Black | 18-20% Loading |
| PE wax | Acumist ® B6 (Honeywell) | 4.5% (w/w) |
| Wax A | | 0% |
| Wax B | | 0% |
| Charge adjuvant | Aluminum stearate | 1.5% (w/w) |

K1 ink

| Resin composition (out of paste solids, ~80% of total formulation solids) | | |
| --- | --- | --- |
| Carrier liquid | Isopar ® L | |
| Resin1 | Nucrel ® 925 (DuPont) | 72% |
| Resin | Nucrel ® 2806 (DuPont) | 18% |
| Resin | Bynel ® 2022 (DuPont) | 10% |
| Pigments/Additives (added to the resin composition) | | |
| Pigment | Carbon Black | 18-20% Loading |
| PE wax | Acumist ® B6 (Honeywell) | 4.5% (w/w) |
| Wax A | SiberFlow C85 (DKSH) | 1% (w/w) |
| Charge adjuvant | Aluminum stearate | 1.5% (w/w) |

K2 ink

| Resin composition (out of paste solids, ~80% of total formulation solids) | | |
| --- | --- | --- |
| Carrier liquid | Isopar ® L | |
| Resin1 | Nucrel ® 925 (DuPont) | 72% |
| Resin | Nucrel ® 2806 (DuPont) | 18% |
| Resin | Bynel ® 2022 (DuPont) | 10% |
| Pigments/Additives (added to the resin composition) | | |
| Pigment | Carbon Black | 18-20% Loading |
| PE wax | Acumist ® B6 (Honeywell) | 4.5% (w/w) |
| Wax B | PINNACLE ® 1995 (Lubrizol) | 4% (w/w) |
| Charge adjuvant | Aluminum stearate | 1.5% (w/w) |

Material Properties of Waxes
1. Wax A—Hydrogenated castor oil derivate
1. Wax B—Polypropylene based

TABLE 1

| Wax | Chemistry | Molecular structure attributes | Melting range (° C.) | Comments |
| --- | --- | --- | --- | --- |
| Wax A C85 | Tri-glyceride | Highly branched, hydroxylated triester | 50-80 | Castor oil |
| Wax B PP195 | Lower T melting peak Higher T melting peak | Poly-propylene | Mixed tacticity $CH_2$—$CH_3$ | 60-110 125-155 | Mixed tacticity |
| PE wax | Polyethylene | Closely packed $CH_2$ | 80-120 | Reference |

TABLE 2

| | Wax A | | Wax B | | Reference materials | | |
|---|---|---|---|---|---|---|---|
| | C85 | | PP195 | | | | EMAA |
| Chemistry | Spec* Castor oil derivative | COA** Castor oil derivative | Micronized modified PP wax | PE wax | EMAA Copolymer resin | EAA Copolymer resin | Ester Terpolymer resin |
| Hydroxyl number | 145-165 | 157.75 | NA | NA | NA | NA | NA |
| Saponification number | 175-185 | 180.77 | NA | NA | NA | NA | NA |
| mp (° C.) | 83-90 | 86.2 | 140 (higher Tmp) | 126 | | 83 | 87 |
| Swelling (Sol-L) | 10% | NA | 12% | 4% | 23% | 23% | 39% |
| Solubility (Sol-L) | 1.91 | NA | 3.8 | 1.8 | 0.3 | 0.24 | 0.65 |

*refers to the value ranges given in the specification of the manufacturer DKSH.
**refers to values measured for the batch used in the examples.

Addition Level of Waxes
1. Wax A 0.25-1% (w/w)
2. Wax B 1-4% (w/w)

Peeling Damage Levels

Two black inks (K1 and K2) and a reference black ink (K) were prepared and tested for adhesion to various substrates using a 180° angle Peeling test. Generally, peeling tests evaluate adhesion of ink to substrate using pressure sensitive adhesive tape. Generally, a strip of adhesive tape is applied on heavy (>100%) coverage freshly printed images and then removed. Damage to the image characterizes the extent of adhesion between the image and the paper.

Specifically, the inks were evaluated using the procedures as previously disclosed, see e.g. US 2010/0047700 A1.

Basically, peeling was evaluated by printing a 100% or 400% image on 10 cm wide stripes of various substrates; 10 minutes after printing: vertically applying one stripe of pressure-sensitive adhesive tape on the set of printed substrate stripes, pressing the tape with a roller of 2 pounds weight on the substrate (10 times back and forth) and removing the tape; evaluating the resulting substrate.

Figure 2:
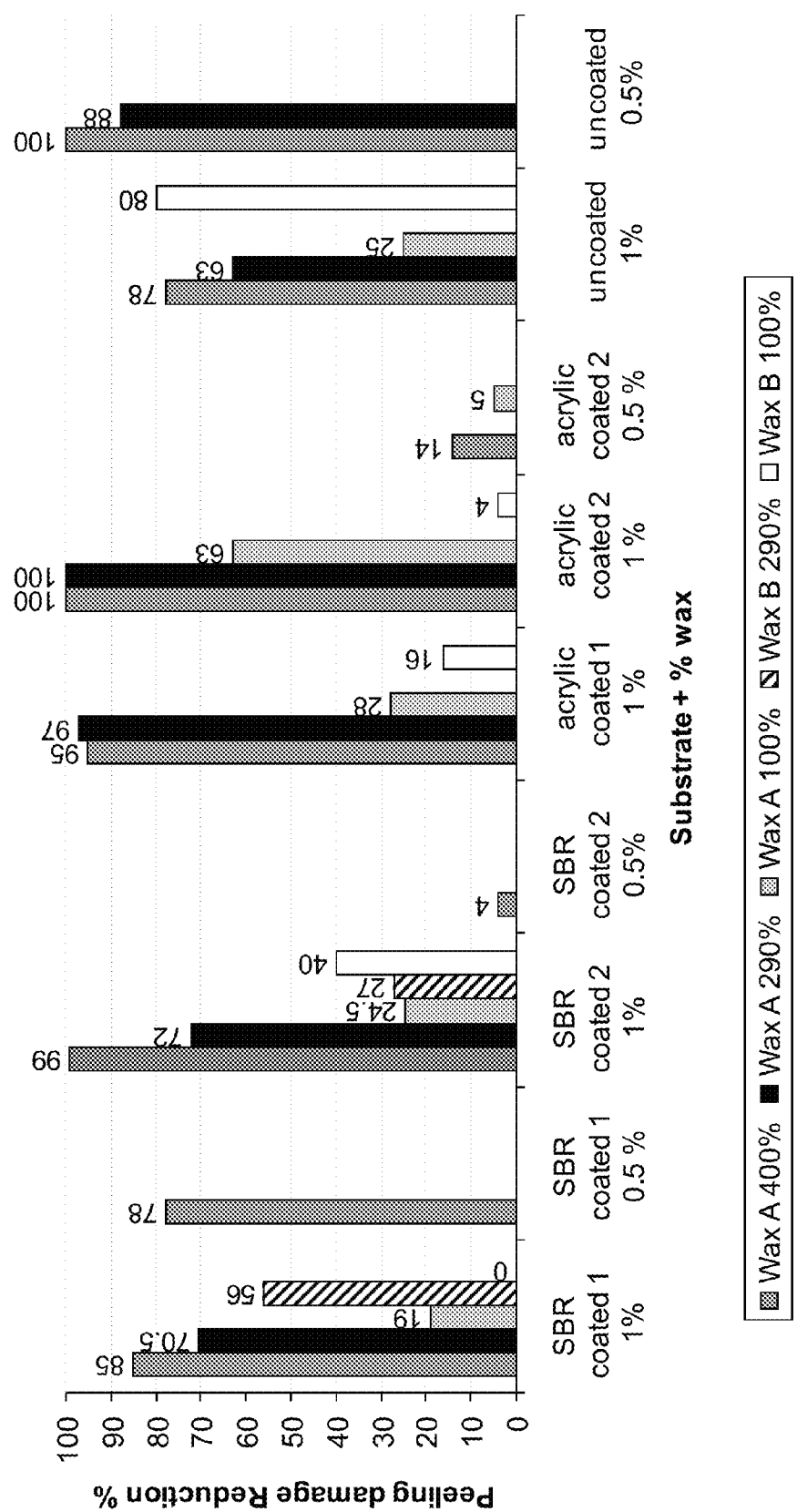
FIG. 2 shows the reduction in peeling damage using inks, upon the addition of two exemplary waxes, on various substrates.

Results are shown in FIGS. 1 and 2.

FIG. 1 shows photographs of printed image of 100% (upper row) and 290% (lower row) coverage, printed on various substrates, namely
SBR coated 1 paper;
acrylic coated 1 paper;
acrylic coated 2 paper;
SBR coated 2 paper;
uncoated paper.

Ink ID:
K—reference black ink without wax additive; K1—black ink with 1% (w/w) wax A; K2—black ink with 4% (w/w) wax B.

FIG. 2 shows the reduction in peeling damage upon wax addition, on various substrates, namely
SBR coated 1 paper;
acrylic coated 1 paper;
acrylic coated 2 paper;
SBR coated 2 paper;
uncoated paper.

In particular, FIG. 2 represents the reduction in peeling damage, compared to reference ink without the wax additive, upon addition of both waxes A and B. Wax A, comprising hydrogenated castor oil derivative, is added to the ink at 0.25-1% (w/w) level. While propylene based wax (wax B) is added at 4% on ink solids. FIG. 2 shows the peeling damage reduction ($\Delta$) in %, with wax-% image remaining after peel test of reference ink (without wax). Peeling damage reduction effect is increasing with increased printed image thickness (i.e. coverage) for both waxes, in particular for wax A. This is allowed due to complete coverage of the paper substrate by the printed ink film with the wax at its outer-most layer (on the surface of the image/printed ink film).

Tape/Image Peel Force

As discussed above, peeling damage reduction effect is increasing with increased printed image thickness (i.e. coverage) for both waxes, in particular for wax A. This is allowed due to complete coverage of the paper substrate by the printed ink film with the wax at its outer-most layer (on the surface of the image/printed ink film).

Figure 3:
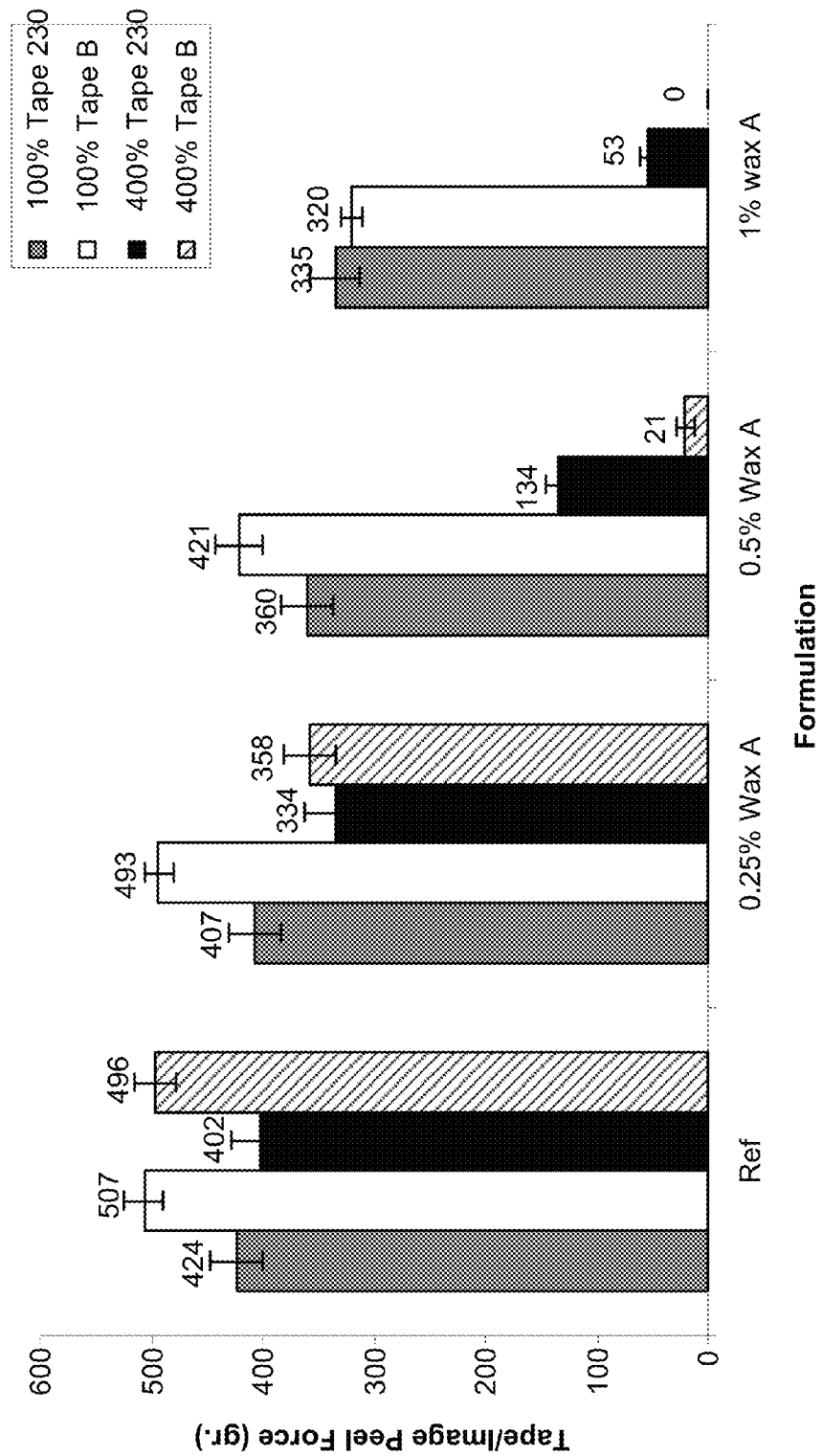
FIG. 3 shows the measured tape/image peel force for exemplary ink formulations with the addition of one exemplary wax.

The increasing effect of the additive, observed at higher coverage, is directly supported by the decrease in tape-image peel force, measured with two different PSA tapes on images of two different coverages (100% and 400% respectively) and increasing wax addition level (of wax A), as demonstrated in FIG. 3. FIG. 3 shows the tape/image peel force (gr.) that is required to separate PSA tape from the printed image surface, upon increasing wax A addition level, wherein the respective image coverage is indicated in the legend.

PSA Tape ID:
Tape 230: 3M 230 standard Peel test tape
Tape B: 3M 8902 (blue) polyester tape The features disclosed in the foregoing description, in the claims and/or in the accompanying drawings may, both separately and in any combination thereof, be material for realizing the invention in diverse forms thereof.

The invention claimed is:

1. A liquid electrophotographic ink, comprising:
   (a) a carrier liquid,
   (b) a pigmented resin composite dispersed in the carrier liquid, wherein the pigmented resin composite comprises an ethylene acrylate resin, an ethylene methacrylic acid copolymer resin, an ethylene acrylic acid copolymer resin, or combination thereof, and
   (c) about 0.15 to about 10% (w/w) of an organic wax, wherein the liquid electrophotographic ink is formulated for printing in a liquid electrophotographic printer.

2. The liquid electrophotographic ink of claim 1, wherein the organic wax has a melting range starting at about 50° C.

3. The liquid electrophotographic ink of claim 1, wherein the organic wax is of natural origin.

4. The liquid electrophotographic ink of claim 3, wherein the organic wax of natural origin is a vegetable wax, and the ink comprises about 0.15 to about 5% (w/w) of the vegetable wax.

5. The liquid electrophotographic ink of claim 1, wherein the organic wax is of synthetic origin.

6. The liquid electrophotographic ink of claim 5, wherein the organic wax of synthetic origin is a polypropylene wax, and the ink comprises about 0.5 to about 10% (w/w) of the polypropylene wax.

7. The liquid electrophotographic ink of claim 1, wherein the organic wax is a vegetable wax.

8. The liquid electrophotographic ink of claim 1, wherein the organic wax is a hydrogenated castor oil derivative.

9. The liquid electrophotographic ink of claim 1, wherein the organic wax of synthetic origin is a polypropylene wax.

10. The liquid electrophotographic ink of claim 1, wherein the organic wax is not a polyethylene-based wax.

11. The liquid electrophotographic ink of claim 10, wherein the liquid electrophotographic ink further comprises a polyethylene-based wax.

12. The liquid electrophotographic ink of claim 1, wherein the pigmented resin composite comprises a blend of an ethylene acrylate resin, an ethylene methacrylic acid copolymer resin, and an ethylene acrylic acid copolymer resin.

13. A method for producing a liquid electrophotographic ink with reduced peeling damage, comprising:
    forming a pigmented resin composite to be dispersed in a carrier liquid, wherein the pigmented resin composite comprises an ethylene acrylate resin, an ethylene methacrylic acid copolymer resin, an ethylene acrylic acid copolymer resin, or combination thereof, and
    adding about 0.15 to about 10% (w/w) of an organic wax during grinding of the pigmented resin composite.

14. The method of claim 13, wherein the organic wax has a melting range starting at about 50° C.

15. The method of claim 13, wherein the organic wax is a vegetable wax and/or wherein about 0.15 to about 5% (w/w) of the vegetable wax are added.

16. The method of claim 15, wherein the vegetable wax is a hydrogenated castor oil derivative.

17. The method of claim 13, wherein the organic wax is a polypropylene wax, and/or wherein about 0.5 to about 10% (w/w) of the polypropylene wax are added.

18. A kit, comprising:
    (1) a ready-made liquid electrophotographic ink comprising a carrier liquid and a pigmented resin composite dispersed in the carrier liquid, wherein the pigmented resin composite comprises an ethylene acrylate resin, an ethylene methacrylic acid copolymer resin, an ethylene acrylic acid copolymer resin, or combination thereof, and
    (2) an organic wax, suitable to be added to the ready-made ink of (1) with a content of about 0.15 to about 10% (w/w), wherein the organic wax has a melting range starting at about 50° C.

19. The kit of claim 18, wherein the organic wax is a vegetable wax and/or wherein the organic wax is a polypropylene wax.

20. The kit of claim 19, wherein the organic wax is the vegetable wax, and the vegetable wax is a hydrogenated castor oil derivative.

* * * * *